United States Patent [19]

Tokumoto et al.

[11] Patent Number: 4,921,346
[45] Date of Patent: May 1, 1990

[54] TUNNEL CURRENT DETECTING PHOTO-ACOUSTIC SPECTROMETER

[75] Inventors: Hiroshi Tokumoto; Hiroshi Bando, both of Tsukuba; Fumiki Sakai, Tokyo; Chikara Miyata, Tokyo; Shigeru Wakiyama, Tokyo, all of Japan

[73] Assignees: Agency of Industrial Science and Technology; Seiko Instruments Inc., Japan

[21] Appl. No.: 246,359

[22] Filed: Sep. 19, 1988

[30] Foreign Application Priority Data

Sep. 18, 1987 [JP] Japan .................... 62-234040

[51] Int. Cl.$^5$ .................... G01N 21/00; G01N 23/00
[52] U.S. Cl. .................... 356/72; 250/306; 356/432
[58] Field of Search .................... 356/72, 432, 432 T; 250/306

[56] References Cited

U.S. PATENT DOCUMENTS

| | | | |
|---|---|---|---|
| 4,343,993 | 8/1982 | Binnig et al. | 250/306 |
| 4,522,510 | 6/1985 | Rosencwaig et al. | 356/432 |
| 4,581,939 | 4/1986 | Takahashi | 356/432 |
| 4,837,435 | 6/1989 | Sakukara et al. | 250/306 |

OTHER PUBLICATIONS

Bul. Electrotech. Lab., vol. 47, No. 2 (1983), "Photoacoustic Spectroscopy in Crystalline Semiconductors", Hotokumoto, pp. 97–108.
Reviews of Modern Physics, vol. 53, No. 3, July 1981, "Pulsed Optoacoustic Spectroscopy of Condensed Matter", C. K. N. Patel et al., pp. 517–550.

Primary Examiner—Richard A. Rosenberger
Attorney, Agent, or Firm—Bruce L. Adams; Van C. Wilks

[57] ABSTRACT

The amount of deformations such as expansions or contractions of a substance caused in accordance with irradiation of cyclically interrupted monochromatic light is detected by either the changes in a tunnel current sensitive to the changing distance between a sample surface and a detection probe or the amount of changes in a probe fine feed mechanism keeping the tunnel current constant between a sample surface and a detection probe at all times, so that the absorption spectrum intrinsic to the substance relative to the irradiating optical energy according to its wavelength is measured to examine the optical properties of the substance.

5 Claims, 3 Drawing Sheets

TUNNEL CURRENT DETECTING PHOTO-ACOUSTIC SPECTROMETER

BACKGROUND OF THE INVENTION

The present invention relates to a spectrometer for examining the optical properties of a substance.

If a substance is irradiated with light, it will absorb the optical energy. This energy will be converted into atomic vibrations, e.g., heat by a non-radiation transition, except that consumed either for another light emission (photoluminescence) or for photo-chemical reactions. The photo-acoustic spectrometry is defined to measure the thus generated calorie or the accompanying strain as a function of excitation optical energy. For this photo-acoustic spectrometry, there is known a device as shown in FIG. 7. This method is disclosed in the reference of the Bul. Electrotech Lab. Vol. 47 No. 2(1983). A sample 5 is placed in a sealed container 3 having an optical irradiation window 1 and an acoustic detector (or a highly sensitive microphone) 2 and is irradiated from the outside with interrupted monochromatic light 6. If the sample 5 absorbs the light and heats up, the temperature of gases surrounding the sample 5 will also rise. As a result, the gas layer is expanded to act as a piston thereby to generate pressure waves 7 in the sealed container 3. If, moreover, the irradiation light is cyclically interrupted, the pressure waves change into sound waves. When the wavelength of the irradiation light is changed and the amount of heat resulting from absorption of light for each wavelength is measured by the microphone system, the absorption spectrum of the sample 5 is obtained. This is known as the gas microphone method for measurement of the photo-acoustic spectrum. There is also known a piezoelectric element method by which strain waves 8 induced in accordance with a local heat generation are directly detected by the use of a piezoelectric element 9 or the like, as shown in FIG. 8.

The gas microphone method described above according to the prior art is accompanied by the following problems: The sealed container for placing the sample has to be filled up with some gas for propagating the deformation of the sample as the pressure waves to the microphone so that the sample being measured has its surface contaminated with the molecules of the gas, whereby the measurements cannot be accomplished with a clean sample surface or in a vacuum; and a substance having a small optical absorption constant is difficult to measure because of limited sensitivity since the pressure waves caused by the deformations of the sample are detected by the microphone.

In order to improve the resolution in the depth direction, on the other hand, it is necessary to increase the interrupted (or modulated) frequency thereby to shorten the period of time for the heat propagation. In the gas microphone method, the signal is weakened with the frequency f of interruption in the form of $f^{-1}$ or $f^{-3/2}$ so that the interruption frequency f cannot be increased so much. In the piezoelectric element method, on the other hand, the light has to be interrupted (or modulated) with the resonance frequency of the element so as to improve the detection sensitivity so that the modulation frequency cannot be continuously changed to limit the depth resolution.

SUMMARY OF THE INVENTION

It is an object of the invention to provide a tunnel current detecting photo-acoustic spectrum of a sample in a vacuum.

Another object of the invention is to provide a tunnel current detecting photo-acoustic spectrometer which is possible to measure a photo-acoustic spectrum of a sample having a low photo-absorption character.

Other and further objects, features and advantages of the invention will appear more fully from the following description.

DETAILED DESCRIPTION

According to the present invention, the amount of deformations of a substance such as expansions or contractions accompanying the absorption of the irradiating optical energy is detected as either the change in the value of the tunnel current flowing between the sample and the detection probe or the amount of changes when the fine feed mechanism is deformed to keep the tunnel current value constant at all times, so that the absorption spectrum intrinsic to the substance relative to the irradiating optical energy may be measured to accomplish the optical analysis of the substance.

According to the method described above, the sample need not be placed in a gas environment for its measurements but can be measured in the vacuum keeping a clean surface. The tunnel current value exponentially changes with the changes in the distance and hence is sensitive to the distance between sample and probe. As a result, it is possible to measure the changes of atomic order (or several Å) in the substance relative to the irradiating optical energy and accordingly even the fine changes in a substance having a small optical absorption coefficient. Moreover, the tunnel current value sufficiently responds to even a high-speed change in the distance so that the measurements can be accomplished in a high-modulation frequency.

First Embodiment

The present invention relates to a measuring system for the absorption spectrum intrinsic to a substance by detecting (measuring) the amount of deformations of the substance such as expansions or contractions accompanying the irradiating optical energy. These will be done either by measuring the changes in the value of a tunnel current flowing between a sample and a detection probe or by measuring the mount of changes resulting from the deformations of a fine feed mechanism to keep the tunnel current value constant at all times. The present invention will be described in the following in connection with the embodiments thereof with reference to the accompanying drawings.

Figure 1:
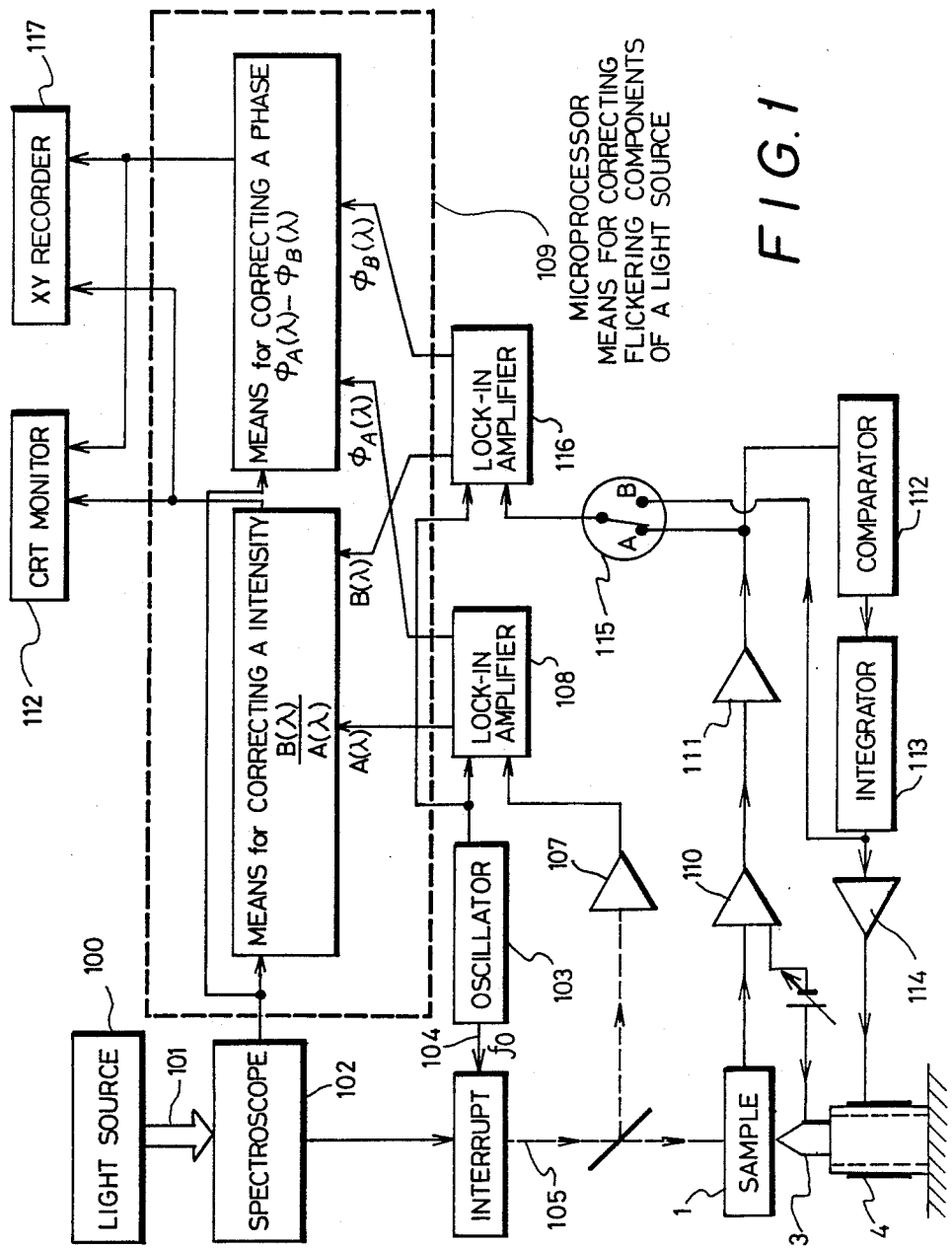
FIG. 1 is a schematic view showing the tunnel current detecting photo-acoustic spectrometer according to the present invention.

FIG. 1 is a schematic diagram showing a tunnel current detecting photo-acoustic spectrometer according to the present invention. White light 101 emitted from a light source 100 is made monochromatic (according to a wavelength selection) by a monochrometer 102 and is flickered into interrupted monochromatic light 105 in synchronism with a signal (having a frequency $f_0$) 104 coming from an oscillator 103. A portion of this interrupted monochromatic light 105 is divided by a beam splitter 106, and this beam of light is guided into a pyroelectric detector amplifier 107 and is tuned and amplified with an interrupted frequency $f_0$ by a lock-in amplifier 108 until it is processed by a microprocessor 109 into a signal $(A(\lambda)e^{-i\phi_A(\lambda)}$, where $A(\lambda)$: intensity; and $\phi_A(\lambda)$: phase) for correcting the fluctuations of the optical intensity and phase accompanying the wavelength scanning. Most of the interrupted monochromatic light irradiates a sample 1 and is absorbed and turned into the amount of deformations such as expansions or contractions of the sample 1. The amount of deformations is detected as the change in the tunnel current flowing between the sample 1 and a probe 3 disposed at a spacing of about 1 nm from the sample 1 and is amplified by an I/V (i.e., current/voltage) amplifier 110 and a logarithmic amplifier 111. This signal is introduced partly through a comparator 112, an integrator 113 and a high-voltage amplifier 114 into a fine feed mechanism 4 so that it is changed into a distance control signal over a relatively long period of time due to the thermal drift between the sample and the probe and partly through the terminal A of a switch 115 into a lock-in amplifier 116 so that it is changed into a signal $(B(\lambda)_e^{-i\phi_B(\lambda)}$, wherein $B(\lambda)$: intensity; and $\phi_B(\lambda)$: phase). Moreover, the flickering components (with each wavelength and time) of the light source are corrected by the calculations (to have an intensity of $B(\lambda)/A(\lambda)$ and a phase of $\phi_A(\lambda)-\phi_B(\lambda)$) of the microprocessor 109. The results are outputted as the intensity and phase to an X-Y recorder 117, a CRT monitor 118 and so on, as shown in FIG. 9.

Figure 9:
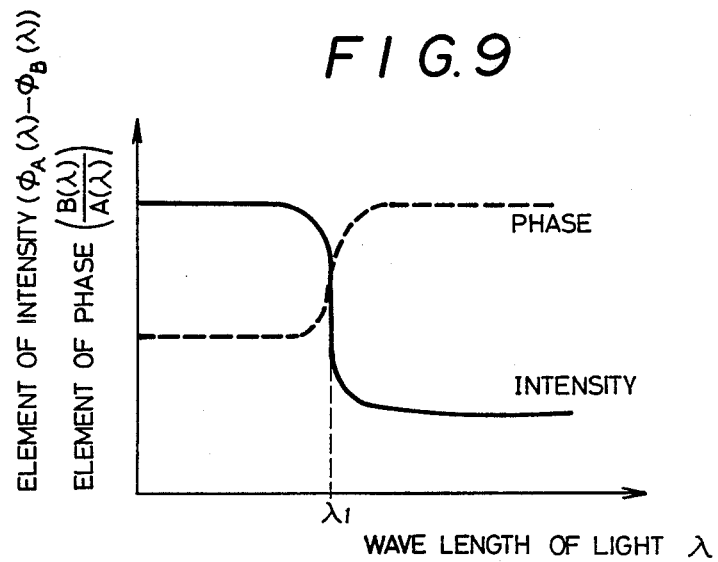
FIG. 9 is a graph plotting the signal changes in the vicinity of the energy gap of the semiconductor.

FIG. 9 plots and example of the signal changes in the vicinity of the energy gap of a semiconductor. The sample measured is identified from the value of the wavelength $l$ at which the intensity and phase components change in accordance with the energy gap intrinsic to the sample material. This is suitable for measurements within frequency bands of a feed back loop. When change in the tunnel current value is detected without responding the fine feed mechanism 4 relative to the deformations of the sample 1. The switch 115 can change these two measuring modes.

Next, the unit for detecting the tunnel current will be described in the following.

Figure 2:
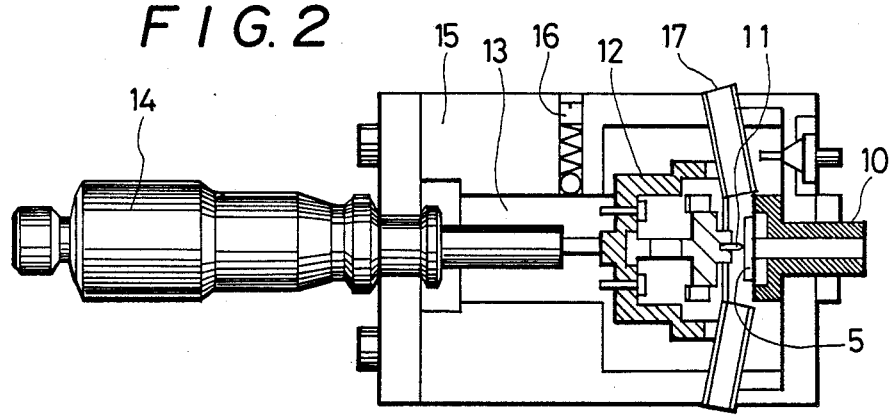
FIG. 2 is a diagram showing the tunnel current detecting unit according to a first embodiment.

FIG. 2 shows the unit for detecting the tunnel current flowing between the sample and the detection probe. A thin sample 5 is mounted on a sample stage 10 having a light hole, and a detection probe 11 is placed to face the sample. The detection probe 11 is fixed on a fine feed mechanism 12 and is fixed through a joint 13 to a coarse feed mechanism 14 for positioning of the distance between the sample 5 and the detection probe 11. In the present embodiment, a precise micrometer is used as the coarse feed mechanism 14. This coarse feed mechanism 14 in turn is fixed in a box 15, and the joint 13 is held without any chatter by a pole-spring-screw mechanism 16 attached to the box 15. This box 15 is equipped with a peep window or a light source window 17 which is used for monitoring coarse positioning of the probe relative to the sample. In order to prevent the light from leaking to the fine feed mechanism, it is also possible to use as a light-guided pipe for irradiating light.

Figure 3:
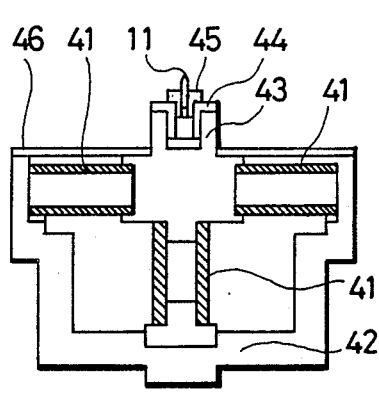
FIG. 3(a) is a section showing the cylindrical cross type fine feed mechanism.
FIG. 3(b) is a top plan view showing the cylindrical cross type fine feed mechanism.
Figure 3:
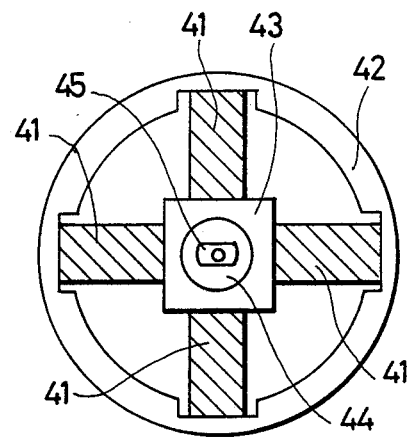
Figure 4:
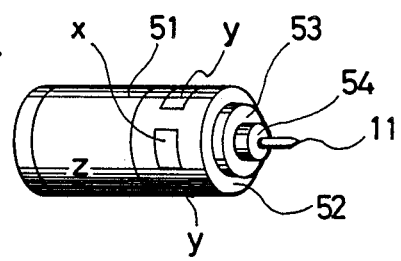
FIG. 4 is a diagram showing the hollow cylindrical fine feed mechanism.

In the present embodiment, a fine feed mechanism shown in FIG. 3(a) and 3(b) or a fine feed mechanism shown in FIG. 4 is used to realize the high-speed response of the aforementioned fine feed mechanism 12. In the fine feed mechanism shown in FIG. 3, hollow cylindrical piezoelectric elements 41 are assembled in a cross shape and in a perpendicular position and each has its one end fixed to an insulated box 42 and its other end fixed to an insulated receptacle 43. This insulated receptacle 43 is internally threaded to secure a metallic detection probe bed 44 which is also internally threaded. Moreover, the detection probe 11 is attached to the probe bed 44 through a detection probe holder 45 which is also internally threaded. The aforementioned insulated box 42 is covered with a shielding plate 46. The operations will be described in the following. The fine feed in the Z-axis direction is accomplished by expanding and contracting the cylindrical piezoelectric element positioned upright perpendicularly to the cross, and the fine feeds in the X and Y-axis directions are accomplished by expanding one of the crossing piezoelectric elements while contracting the other.

In another fine feed mechanism shown in FIG. 4, an insulating member 52 and an internally threaded metallic detection probe bed 53 are fixed in a hollow cylindrical piezoelectric element 51, and the detection probe 11 is attached to the detection probe bed 53 through an internally threaded detection probe holder 54. Moreover, a common electrode is arranged inside of the cylindrical piezoelectric element 51, and Z-axis electrodes and staggered X- and Y-axis electrodes are arranged outside of the cylindrical piezoelectric element 51. The operations of this fine feed mechanism will be described in the following. The Z-axis feed is accomplished through expansions and contractions by applying a plus or minus voltage to the inside common electrode, and the X- and Y-axis feeds are accomplished through bending motions resulting from expansions and contractions by applying a plus voltage to one of the crossing electrodes relative to the inside common electrode and a minus voltage to the other.

Figure 5:
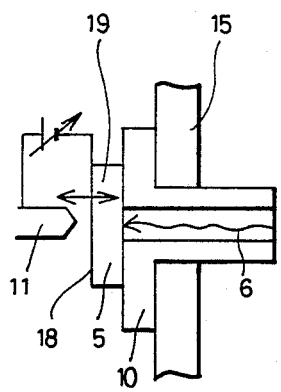
FIG. 5 is an enlarged view showing the sample and the detection probe of the present invention.

Next, the operations for detecting the tunnel current will be described in the following. As shown in FIG. 5 (in case the sample is nonconductive), a bias voltage is applied between the detection probe 11 and a conductive metal 18 formed by either sputtering or evaporation. Thus, the tunnel current is detected by operating the Z-axis of the fine feed mechanism 12 to further bring the sample 5 and the detection probe 11 close to several nm. Then, the sample 5 is irradiated with the interrupted monochromatic light 6 through the hole of the sample bed 10 so that the resultant deformations (in the direction of arrow 19) of the sample 5 are measured by either the changes in the tunnel current value or the amount of deformations of the fine feed mechanism.

Moreover, the aforementioned controls of the irradiation light, the tunnel current value detection and the fine feed mechanism are accomplished by the optical control system and the tunnel current detecting and fine feed mechanism control systems shown in FIG. 1.

With the construction thus far described, the photo-acoustic spectrometer can measure the fine change of a substance accompanied by the irradiating optical energy.

Second Embodiment

Figure 6:
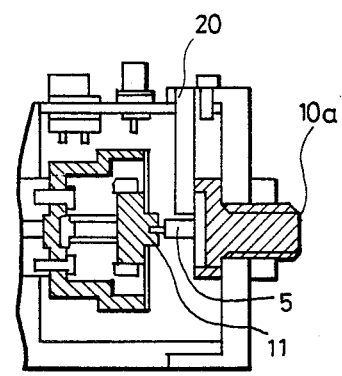
FIG. 6 is a diagram showing the leading end of the tunnel current detecting unit according to a second embodiment.
Figure 7:
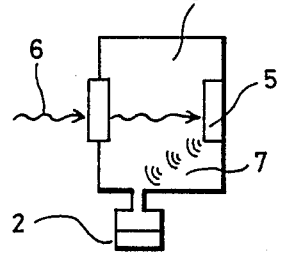
FIG. 7 is a schematic view showing the gas microphone method.
Figure 8:
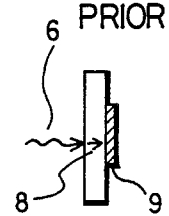
FIG. 8 is a schematic view showing the piezoelectric element method.

FIG. 6 shows the leading end of a tunnel current detection unit according to a second embodiment of the present invention. The leading end is different from the foregoing first embodiment: an optical pipe 20 for irradiating the sample 5 sideways with light is attached. It has been confirmed that this unit can also attain the effects similar to those of the first embodiment.

Thus, the amount of deformations of a substance such as expansions or contractions relative to the irradiating optical energy is detected as either the changes in the value of a tunnel current flowing between the sample and the detection probe or the amount of changes resulting from deformations of the fine feed mechanism to keep the tunnel current value constant at all times. It is possible to measure the sample in a vacuum in which the surface is clean and the fine changes of a substance having a small optical absorption coefficient in terms of the changes in the tunnel current value which is very sensitive to the distance. Thus, the range of samples to be measured can be widened. Since, moreover, the tunnel current responsible to the high-speed changes is detected, the heat propagation time can be shortened by increasing the interruption (or modulation) frequency, so that the resolution in the depth direction can be improved.

We claim:

1. A tunnel current detecting photo-acoustic spectrometer comprising: a sample stage for mounting a sample thereon and a detection probe positioned to face the sample; a fine feed mechanism for finely positioning the sample and the detection probe; a coarse feed mechanism for coarsely positioning the distance between the sample and the detection probe; a control system for controlling said fine feed mechanism by generating a tunnel current sensitive to the distance between the sample and the detection probe so that the value of said tunnel current may be kept constant at all times; a control system for scanning the fine feed mechanism in a plane; a measurement system for measuring either the changes in value of the tunnel current flowing between the sample and the detection probe or the amount of changes in the fine feed mechanism caused to keep constant the distance between the sample and the detection probe so as to keep the tunnel current value constant at all times; an indication mechanism for indicating the amount of changes in the fine feed mechanism; an optical control system for controlling interrupted monochromatic light with which the sample is to be irradiated; and a vibration preventing mechanism for preventing the sample, the sample stage, the detection probe, the fine feed mechanism and said coarse feed mechanism from vibrating, whereby the amount of such deformations, e.g., expansions or contractions of a substance as are caused in accordance with the, absorption of the irradiating optical energy is detected as either the changes in the tunnel current flowing through said sample and said detection probe or the amount of changes resulting from deformation of said fine feed mechanism in a manner to keep said tunnel current value constant at all times, so that an absorption spectrum intrinsic to said substance relative to the irradiation energy may be measured to examine the optical characteristics.

2. A tunnel current detecting photo-acoustic spectrometer as set forth in claim 1, wherein the place for detecting the tunnel current is so selected relative to the optically irradiation place by the in-plane scanning as to have the maximum sensitivity.

3. A tunnel current detecting photo-acoustic spectrometer as set forth in claim 1, wherein the behaviors of heat or strain propagations accompanying a local optical irradiation can be detected at a high speed.

4. A method for measurement of a photo-acoustic spectrum by detecting a tunnel current, comprising the steps of:
providing a sample whose photo-acoustic spectrum is to be measured;
finely positioning a detecting probe closely opposed to the surface of the sample;
irradiating the surface of the sample with a cyclically intermitted monochromatic light and changing a wavelength of the monochromatic light; and
detecting the change of a tunnel current corresponding to the change of the distance between the sample and the detecting probe accompanied by the absorption of the monochromatic light for measuring a photo-acoustic spectrum.

5. A method for measurement of a photo-acoustic spectrum by detecting a tunnel current, comprising the steps of:
providing a sample whose photo-acoustic spectrum is to be measured;
finely positioning a detecting probe closely opposed to the surface of the sample;
irradiating said surface of said sample with a cyclically intermitted monochromatic light and changing a wavelength of said monochromatic light;
detecting a tunnel current between the detecting probe and the same surface; and
moving the probe in a normal line direction of the surface for keeping the tunnel current constant corresponding to the absorption of the monochromatic light for measuring a photo-acoustic spectrum.

* * * * *